United States Patent
Kerjean et al.

(10) Patent No.: US 6,250,291 B1
(45) Date of Patent: Jun. 26, 2001

(54) METHOD FOR CONTROLLING AN INTERNAL COMBUSTION ENGINE EQUIPPED WITH A DEVICE FOR RECYCLING EXHAUST GASES

(75) Inventors: Jean-Jacques Kerjean, Toulouse; Françoise Rembaud, Plaisance du Touch; Dominique Salafia, Tournefeuille, all of (FR)

(73) Assignee: Siemens Automotive S.A., Toulouse Cedex (FR)

( * ) Notice: Subject to any disclaimer, the term of this patent is extended or adjusted under 35 U.S.C. 154(b) by 0 days.

(21) Appl. No.: 09/367,211

(22) PCT Filed: Feb. 6, 1998

(86) PCT No.: PCT/EP98/00667

§ 371 Date: Aug. 10, 1999

§ 102(e) Date: Aug. 10, 1999

(87) PCT Pub. No.: WO98/35149

PCT Pub. Date: Aug. 13, 1998

(30) Foreign Application Priority Data

Feb. 10, 1997 (FR) .................................................. 97 01641

(51) Int. Cl.[7] .................................................. F02D 41/14
(52) U.S. Cl. .......................................... 123/681; 123/698
(58) Field of Search .................................... 123/698, 682, 123/687, 681; 701/108

(56) References Cited

U.S. PATENT DOCUMENTS

| 4,075,835 | 2/1978 | Hattori et al. | |
|---|---|---|---|
| 5,361,745 | * 11/1994 | Suzuki et al. | 123/698 |
| 5,551,408 | * 9/1996 | Shimizu et al. | 123/695 |
| 5,570,673 | * 11/1996 | Isobe | 123/688 |
| 5,832,896 | * 11/1998 | Phipps | 123/352 |

FOREIGN PATENT DOCUMENTS

| 0262045A1 | 3/1988 | (EP) . |
|---|---|---|
| 2677123 | 12/1992 | (FR) . |

OTHER PUBLICATIONS

Japanese Patent Application No. 54124119 (Keiso), dated Sep. 26, 1997.
Japanese Patent Application No. 63124849 (Yoshiharu), dated May 28, 1988.
Japanese Patent Application No. 05302548 (Yoji), dated Nov. 16, 1993.
Japanese Patent Application No. 57193739 (Nobuaki), dated Nov. 29, 1982.

* cited by examiner

Primary Examiner—Andrew M. Dolinar
Assistant Examiner—Arnold Castro
(74) Attorney, Agent, or Firm—Herbert L. Lerner; Laurence A. Greenber; Werner H. Stemer

(57) ABSTRACT

Process for controlling an internal combustion engine equipped with an exhaust gas recirculation device (5) comprising a recirculation valve (51) and a device for regulating an air/fuel mixture injected into an inlet circuit as a function of the signal (LAM_AV) of an oxygen probe (41) placed in the exhaust circuit (4), characterized in that the controls of the valve (EGR_CTRL) are synchronized with at least one transition of a correction (LAM_COR) of the richness of the mixture in order to reduce the transient pollution peaks generated by the operating of the exhaust gas recirculation valve (51).

9 Claims, 2 Drawing Sheets

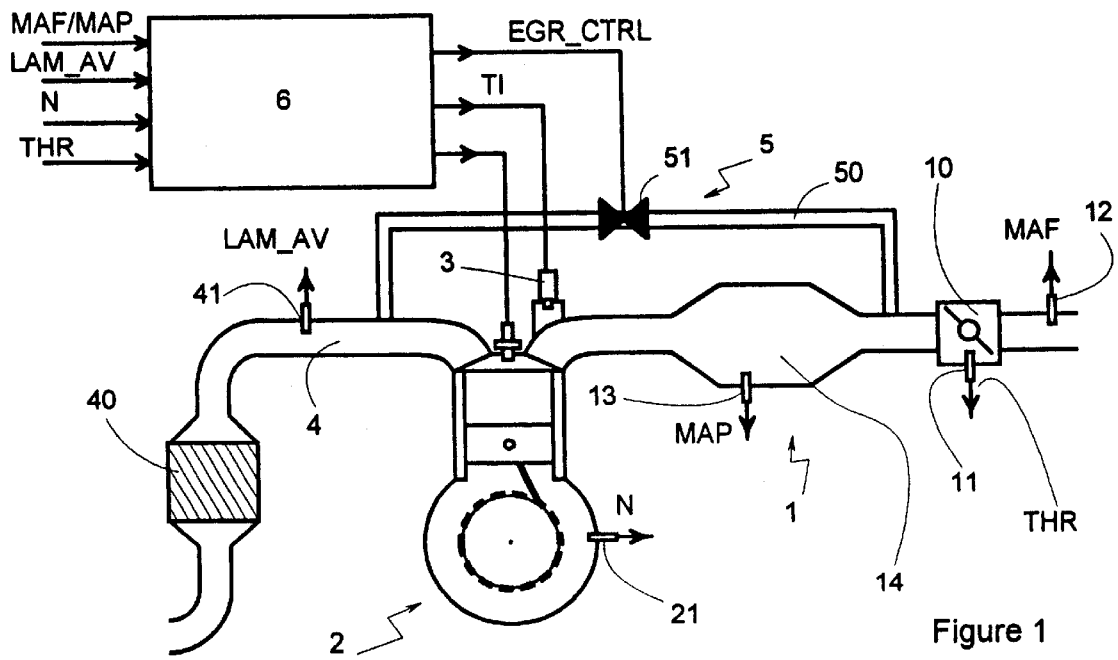
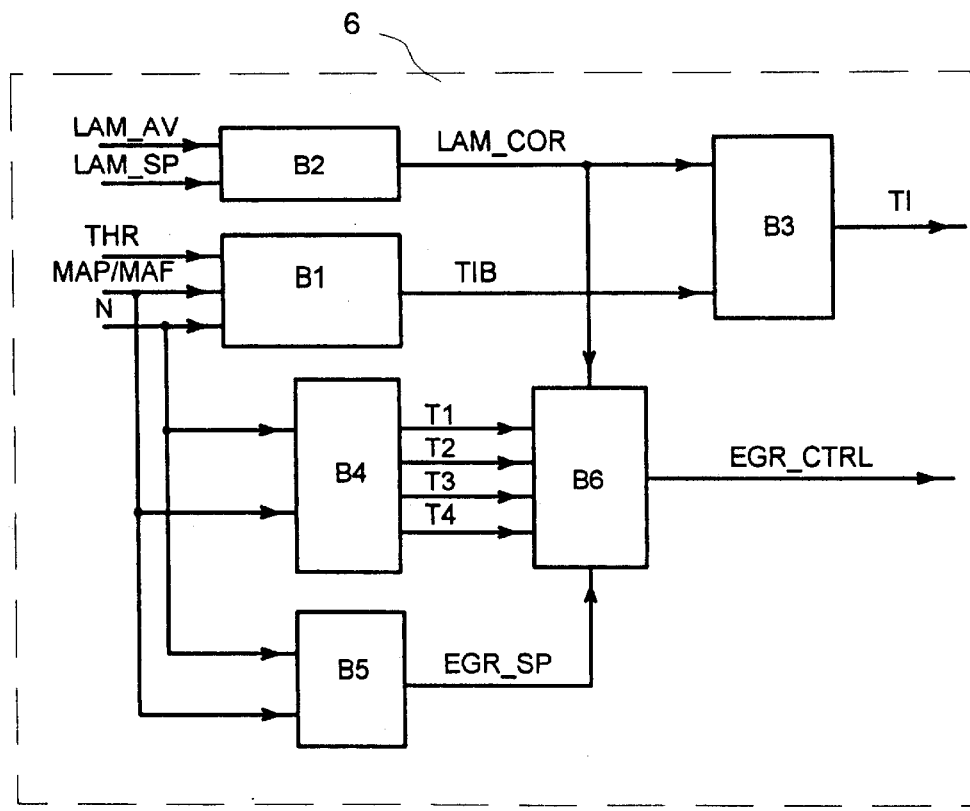
Figure 1
Figure 2

METHOD FOR CONTROLLING AN INTERNAL COMBUSTION ENGINE EQUIPPED WITH A DEVICE FOR RECYCLING EXHAUST GASES

BACKGROUND OF THE INVENTION

1. Field of the Invention

The present invention relates to a process for controlling an internal combustion engine, and relates more particularly to such a process designed to control the recirculation of exhaust gases.

Because of the requirements to reduce the pollution of internal combustion engines, exhaust gases have to be recirculated to the inlet side of the engine in certain operating regimes.

2. Description of the Related Art

Document FR 2 677 123, for example, discloses a process for controlling and diagnosing an internal combustion engine comprising an exhaust gas recirculation device. The engine is controlled conventionally by controlling an amount of fuel delivered by an injector placed in the inlet manifold to suit the operating parameters such as the pressure in the inlet manifold and the engine speed. An oxygen probe placed in the exhaust manifold allows the richness of the mixture to be regulated to keep it around the stochiometric value. The engine further comprises an exhaust gas recirculation device consisting of a recirculation pipe connecting the exhaust manifold to the inlet manifold, said pipe being equipped with a valve that allows the amount of exhaust gases reintroduced in the inlet side to be regulated.

In certain operating regimes in which it is necessary to obtain a reduction in the temperature of combustion in the engine cylinder, the recirculation valve is therefore made to open so that neutral gas can be introduced into the mixture. In this way it becomes possible to reduce the omissions of polluting gases, such as oxides of nitrogen for example, in the exhaust gases.

Document JP-A-54 124 119 suggests synchronizing the control of the recirculation valve with the transitions of a signal from an oxygen probe placed in the exhaust manifold. However, the intended objective is to minimize variations in torque and does not take account of the pollution generated by synchronization of this kind.

It has been found that when the recirculation valve is made to open or to close, a peak of pollutants liable to exceed the purification capability of a catalytic converter placed in the exhaust manifold occurred.

The object of the present invention is therefore to provide a process for controlling an internal combustion engine which is more particularly suited to reducing these pollution peaks. The objects of the invention are achieved by means of a process for controlling an internal combustion engine equipped with an exhaust gas recirculation device comprising a recirculation valve and with a device for regulating the air-fuel mixture injected into the inlet circuit as a function of the signal from an oxygen probe placed in the exhaust circuit. According to the invention, control of the recirculation valve is synchronized with at least one transition of a correction of the richness of the mixture so that opening and/or closure of the recirculation valve occur respectively during a phase in which the air/fuel mixture is being enriched and/or a phase during which it is becoming more lean.

According to the invention, the control of the recirculation valve is synchronized with at least one transition of a correction of the richness of the mixture.

In a first embodiment of the invention, the valve is made to open in a first time window, the start and the end of which are determined such that the actual opening of the valve, which is defined by an increase in the inlet pressure at the inlet to a cylinder of the engine as a result of the opening of the valve, occurs during a phase in which the air/fuel mixture is enriched. Advantageously, this first time window for allowing the valve to be opened is determined by two durations measured from a transition of the mixture from rich to lean, these durations being a function of the speed and of a value representing the load of the engine.

Likewise, the valve is made to close in a second time window, the start and end of which are determined such that the actual closure of the valve, which is defined by a decrease in the inlet pressure at the inlet to a cylinder of the engine as a result of the closure of the valve, occurs during a phase in which the air/fuel mixture becomes more lean. Advantageously, this second time window for allowing the valve to be closed is determined by two durations measured from a transition of the mixture from lean to rich, these durations being a function of the speed and of a value representing the load of the engine.

In a second embodiment, the time windows begin respectively upon a transition from lean to rich, in the case of opening, and from rich to lean, in the case of closing, and end after a fifth, or respectively sixth, duration, said durations being a function of the speed and of a value representing the load of the engine.

SUMMARY OF THE INVENTION

Other features and advantages of the process according to the invention will become clear on reading the description which will follow and on examining the appended drawings, in which:

BRIEF DESCRIPTION OF THE DRAWINGS

FIG. 1 depicts an internal combustion engine equipped with an exhaust gas recirculation device controlled by a computer capable of implementing the process according to the invention, FIG. 2 depicts the functional architecture of said computer.

DESCRIPTION OF THE PREFERRED EMBODIMENT

Figure 3:
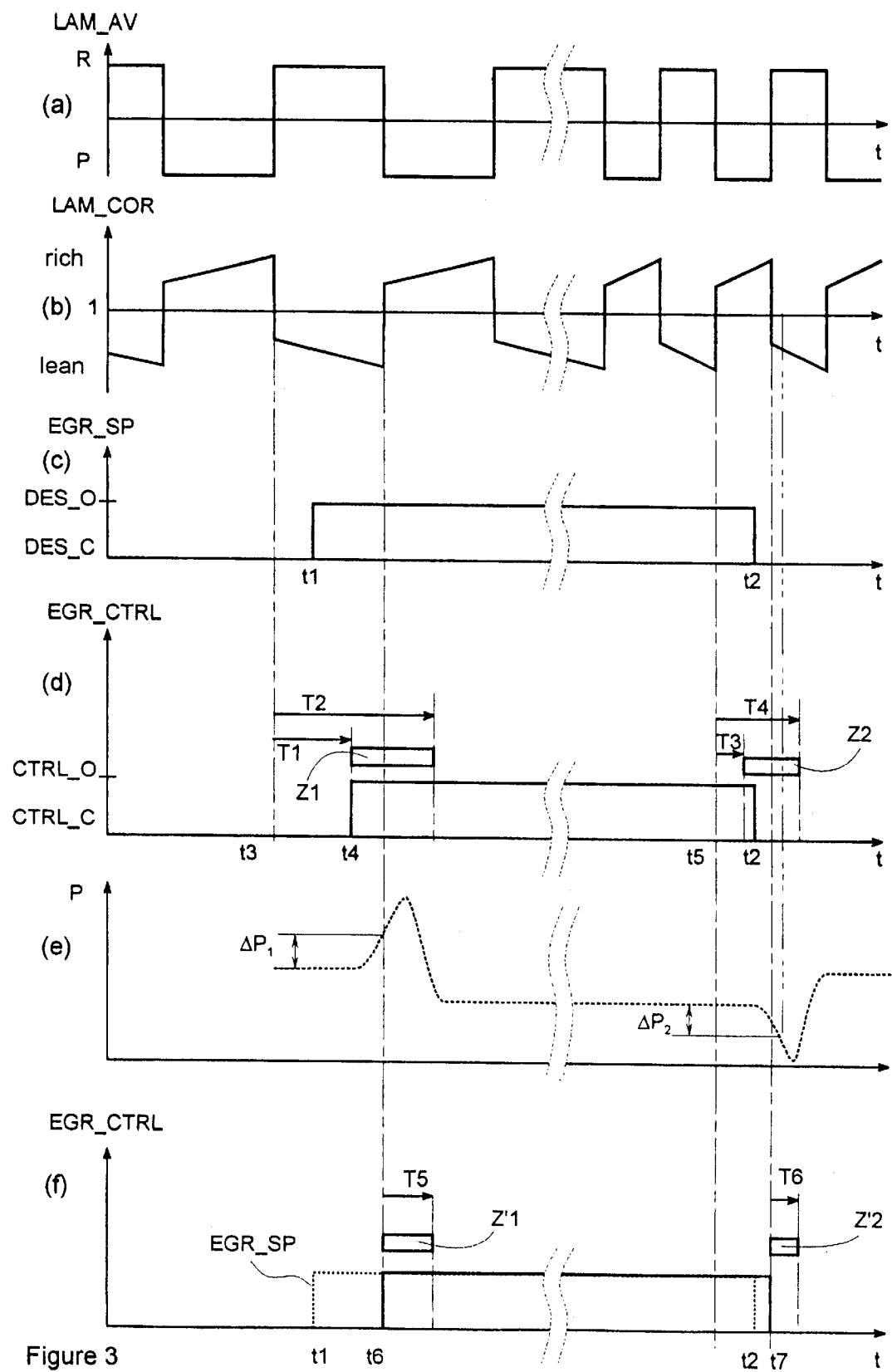
FIG. 3 depicts timing charts of signals allowing the way in which the invention works to be explained.

Reference is now made to FIG. 1 which depicts an internal combustion engine comprising an inlet manifold 1, an engine block 2 and an exhaust manifold 4. The inlet manifold comprises a throttle valve 10, possibly equipped with an angular-position sensor 11 delivering a signal THR representing the position of the throttle valve. An air mass flow rate sensor 12 provides a signal MAF representing the mass of air entering the inlet manifold. The manifold also comprises a cavity 14 known as a plenum in which there is placed an absolute-pressure sensor 13 delivering a signal MAP. The engine block 2 is equipped with a rotational-speed sensor 21 delivering a speed signal N. The exhaust manifold 4 contains a catalytic converter 40 intended to purify the exhaust gases and an oxygen probe 41 delivering a signal LAM_AV representing the oxygen content of the exhaust gases and therefore the richness of the mixture burnt in the engine.

The engine is also equipped with an exhaust gas recirculation device 5 comprising a pipe 50 placing the exhaust manifold 4 in communication with the inlet manifold 1 upstream of the plenum 14. A recirculation valve 51 is placed in the pipe to control the amount of exhaust gas recirculated to the inlet side. Also depicted is a computer 6 receiving signals from the various sensors MAF/MAP, LAM_AV, N, THR and other signals such as the temperature of the air entering the engine, the temperature of the coolant, from sensors, not depicted. The computer also supplies a signal TI for controlling an injector 3 allowing the amount of fuel supplied to the engine to be metered, together with a signal EGR_CTRL for controlling the exhaust gas recirculation valve.

It has been found that the pollution peaks observed when operating the recirculation valve arose from the effect of a pressure wave obtained upon opening or closing the valve 51 in the pipe 50 and in the plenum 14. Specifically, when the valve is opened, the exhaust gases present in the manifold 4 push a column of air along the pipe 50 and this causes an increase in the partial pressure of oxygen at the inlet to the cylinder of the engine 2. Likewise, when the valve 51 is closed, a transient depression is observed in the pipe 50 and this results in a drop in the partial pressure of oxygen at the inlet to the cylinder. These variants in oxygen pressure in the cylinder lead to variations in the richness of the burnt mixture and therefore to peaks of pollutants liable not to be purified by the catalytic converter 40.

The invention therefore consists in synchronizing the effect of these variations in oxygen pressure with phases of enriching the supply of fuel or, respectively, of making it more lean, the supply being generated by closed-loop control of the richness of the mixture performed by the oxygen probe 41, as will be seen later in conjunction with the graphs of FIG. 3.

Reference is now made to FIG. 2 which depicts the partial functional architecture of the computer 6 for those parts which are relevant to the process according to the invention. A first block B1 receives information from the inlet-pressure sensor MAP and/or from the air mass flow rate sensor MAF, the speed N, the degree of openness of the throttle valve THR, and other information not depicted such as the air temperature and/or the coolant temperature. It formulates a basic injection time TIB from a map obtained during engine bench tests. A second block B2 receives the signal LAM_AV from the oxygen probe 41 and a richness setpoint value LAM_SP and produces a richness correction signal LAM_COR. The two signals are then transmitted to a block B3 which in the conventional way produces the signal TI for controlling the injector 3. A fourth block B4 receives the signal N representing the rotational speed of the engine and a signal representing the engine load. This signal may be deduced from the pressure MAP in the inlet manifold or alternatively from the inlet air mass flow rate MAF and from the speed N or alternatively from the position of the throttle valve THR and from the speed. In the example which follows, we shall adopt the inlet pressure MAP as being the variable representing the engine load. This block B4, from these signals, formulates four durations T1 and T4 from a table stored in memory during engine bench testing. The method in which these durations are formulated will be explained later in conjunction with FIG. 3. A fifth block B5 also receives signals representing the engine load and the speed to produce an exhaust gas recirculation setpoint signal EGR_SP. The durations T1 to T4, the setpoint signal EGR_SP and the richness correction signal LAM_COR are supplied to a block B6 to produce a signal EGR_CTRL for controlling the valve 51.

Reference is now made to FIG. 3 to detail the control process according to the invention. FIG. 3(*a*) depicts a time graph of the signal LAM_AV delivered by the richness probe 41. This signal has two states, denoted R and P respectively, and which represent the combustion of a rich mixture and that of a lean mixture. A signal of this kind is obtained, for example, by means of an oxygen probe of the titanium oxide $TiO_2$ or zirconium oxide $ZrO_2$ type.

The richness correction signal LAM_COR produced by the block B2 and intended to correct the basic injection time TIB in the block B3 is depicted in (b) in the same phase. As can been seen in the figure, when the signal from the probe 41 represents combustion of a lean mixture, the correction signal LAM_COR is used to enrich the mixture by a proportional transition followed by an integral ramp until the probe signal changes state. The mixture is thus alternately enriched and made more lean in phases, depending on the state of the probe.

The exhaust gas recirculation setpoint signal EGR_SP from block B5 is depicted in (c). Depending on the engine load and speed conditions prevailing at the input to the block B5, this signal exhibits an initial state DES_C, for example representing an "absence of recirculation" (valve closed) setpoint. At the instant t1, it is assumed that the speed and load conditions are such that exhaust gas recirculation may be envisaged. The setpoint signal EGR_SP therefore adopts a value DES_0 representing an open setpoint. Of course, these values could just as easily be open setpoint values other than "wide open" or "fully closed". It is, for example, possible to envisage the signal quantitatively representing a desired degree of opening of the valve. At the instant t2, as the exhaust gas recirculation conditions are no longer all fulfilled, the setpoint signal returns to a value DES_C corresponding to the valve being closed.

We now come, in conjunction with graph (d), to the operation of block B6. At the instant t3 corresponding to a transition of the signal LAM_COR beginning a phase in which the mixture becomes more lean, the block B6 counts down the durations T1 and T2 thus defining, from the start of the becoming-lean phase, a first time window Z1. As soon as this time window opens, in the presence of a recirculation setpoint signal with the state DES_0, the block B6 switches the signal EGR_CTRL for controlling the valve 51 from the state CTRL_C (closed) to the state CRTL_O (open). Likewise, at the instant t5 corresponding to the start of a mixture-enriching phase, the block B6 counts down the durations T3 and T4 defining a second time window Z2. At the instant T2 which falls inside the time window Z2, with the setpoint signal EGR_SP switching to the state DES_C, the signal EGR_CTRL for controlling the valve also switches to the state CTRL_C, representing closure of the valve 51.

As was seen earlier, the opening of the valve 51 sets up a pressure wave in the pipe 50 and in the plenum 14, generating a transient overpressure of oxygen at the inlet to the engine cylinder. As can be seen in graph (e) of FIG. 3, where the partial pressure of oxygen is depicted on the ordinates and time is depicted on the abscissa, upon opening of the valve at the instant t4, the partial pressure of oxygen increases. This transient increase has the effect of causing lean-mixture combustion which has to be wiped out by synchronizing the pressure peak with a transition of the correction of the air/fuel mixture toward a rich mixture. However, bearing in mind parameters such as the geometry of the inlet circuit and the dynamics of the gases, the effect of opening the valve is not felt immediately at the inlet to the cylinder. The actual opening of the valve is therefore determined by the instant at which the oxygen overpressure reaches a predetermined threshold $\Delta P_1$. The duration T1 is thus defined in such a way that an opening of the valve, occurring immediately after T1, does not have an effect in the cylinder until after a transition from lean to rich of the signal LAM_COR determining the start of a mixture-enriching phase. Likewise, the duration T2 is defined in such a way that an opening of the valve 51, occurring at the end of the duration T2, leads to an effective opening of the valve occurring before the end of this air/fuel mixture enriching phase. The durations T1 and T2 are determined in a table as a function of the speed and load perimeters by engine bench tests, during engine development. The durations T3 and T4 for the closing of the valve are determined in a similar way, these symmetrically causing a transient drop in the partial pressure of oxygen, so that closure of the valve inside the second time window Z2 produces its effect during the next phase of making the mixture more lean. Time windows Z1 for opening (and Z2 for closing) are thus generated upon each transition of the richness correction signal LAM_COR from rich to lean (or from lean to rich). A command to open or to close the valve 51 is produced during these time windows only if the setpoint signal EGR_SP has changed state immediately before or during this window.

A second embodiment of the invention will now be described in conjunction with graph (f) of FIG. 3. In this embodiment, the start of the first time window Z'1 is determined by a transition of the air/fuel mixture from lean to rich. The end of the time window Z'1 is obtained after a fifth duration T5 such that the effect of opening the valve is felt during the enriching phase beginning at this transition. Likewise, the start of the second time window Z'2 is synchronized with a transition of the mixture from rich to lean at the instant t7. This second time window Z'2 ends at the end of a duration T6 calculated such that the effect of closing the valve 51 at the end of the window remains inside the same phase of the mixture becoming more lean. This embodiment of the invention has the advantage, over the previous embodiment, of requiring less calculation power and memory capacity to implement it.

Of course, the invention is not restricted to the embodiment described, but could alternatively be achieved by determining the durations T1 to T4 and T5 and T6 as a function of the period of time between two consecutive transitions of the mixture correction signal from rich to lean or from lean to rich.

What is claimed is:

1. A process for controlling an internal combustion engine with an exhaust circuit, an oxygen probe in the exhaust circuit, and an exhaust gas recirculation device with a recirculation valve and a device for regulating an air/fuel mixture injection into an inlet circuit as a function of a signal of the oxygen probe, the method which comprises:

synchronizing a control of the recirculation valve with a transition of a correction of a richness of the air/fuel mixture;

opening the recirculation valve in a first time window, and defining a start and an end of the first time window such that an actual opening of the valve, defined by an increase above a predetermined threshold in an inlet pressure at an inlet to an engine cylinder as a result of the opening of the valve, occurs during a phase wherein the air/fuel mixture is enriched; and closing the recirculation valve during a phase wherein the air/fuel mixture becomes more lean.

2. The process according to claim 1, which comprises:

defining the start of the first time window at the end of a first time period after a transition of the air/fuel mixture from rich to lean;

defining the end of the first time window at the end of a second time period after the transition of the air/fuel mixture from rich to lean; and defining the first time period and the second time period as a function of a speed of the engine and a value representing a load of the engine.

3. The process according to claim 1, which comprises:

defining the start of the first time window upon a transition of the air/fuel mixture from lean to rich;

defining the end of the first time window at an end of a fifth time period after the transition of the air/fuel mixture from lean to rich; and defining the fifth time period as a function of a speed of the engine and of a value representing a load of the engine.

4. The process according to claim 1, which comprises closing the recirculation valve in a second time window, and defining a start and an end of the second time window such that an actual closing of the valve, defined by a decrease above a predetermined threshold in an inlet pressure at an inlet to an engine cylinder as a result of the closure of the valve, occurs during a phase wherein the air/fuel mixture becomes more lean.

5. The process according to claim 4, which comprises:

defining the start of the second time window at the end of a third time period after a transition of the air/fuel mixture from lean to rich;

defining the end of the second time window at the end of a fourth time period after the transition of the air/fuel mixture from lean to rich; and defining the third time period and the fourth time period as a function of a speed of the engine and a value representing a load of the engine.

6. The process according to claim 4, wherein:

defining the start of the second time window upon a transition of the air/fuel mixture from rich to lean;

defining the end of the second time window at an end of a sixth time period after the transition of the air/fuel mixture from rich to lean; and defining the sixth time period as a function of a speed of the engine and of a value representing a load of the engine.

7. A process for controlling an internal combustion engine with an exhaust circuit, an oxygen probe in the exhaust circuit, and an exhaust gas recirculation device with a recirculation valve and a device for regulating an air/fuel mixture injection into an inlet circuit as a function of a signal of the oxygen probe, the method which comprises:

synchronizing a control of the recirculation valve with a transition of a correction of a richness of the air/fuel mixture;

opening the recirculation valve during a phase wherein the air/fuel mixture is enriched; and closing the recirculation valve in a defined time window, and defining a start and an end of the defined time window such that an actual closing of the valve, defined by a decrease above a predetermined threshold in an inlet pressure at an inlet to an engine cylinder as a result of the closure of the valve, occurs during a phase wherein the air/fuel mixture becomes more lean.

8. The process according to claim 7, which comprises:

defining the start of the second time window at the end of a third time period after a transition of the air/fuel mixture from lean to rich;

defining the end of the second time window at the end of a fourth time period after the transition of the air/fuel mixture from lean to rich; and defining the third time period and the fourth time period as a function of a speed of the engine and a value representing a load of the engine.

9. The process according to claim 7, wherein:

defining the start of the second time window upon a transition of the air/fuel mixture from rich to lean;

defining the end of the second time window at an end of a sixth time period after the transition of the air/fuel mixture from rich to lean; and defining the sixth time period as a function of a speed of the engine and of a value representing a load of the engine.

* * * * *